Feb. 11, 1964 H. MULCH ETAL 3,120,779
SLIDE PROJECTOR WITH PRECISE FOCUSING
Original Filed Oct. 24, 1958 5 Sheets-Sheet 1
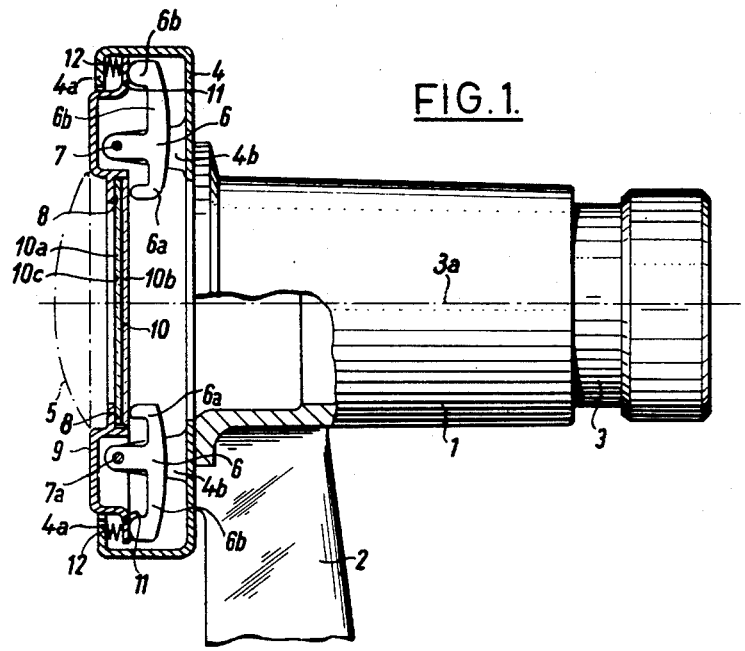
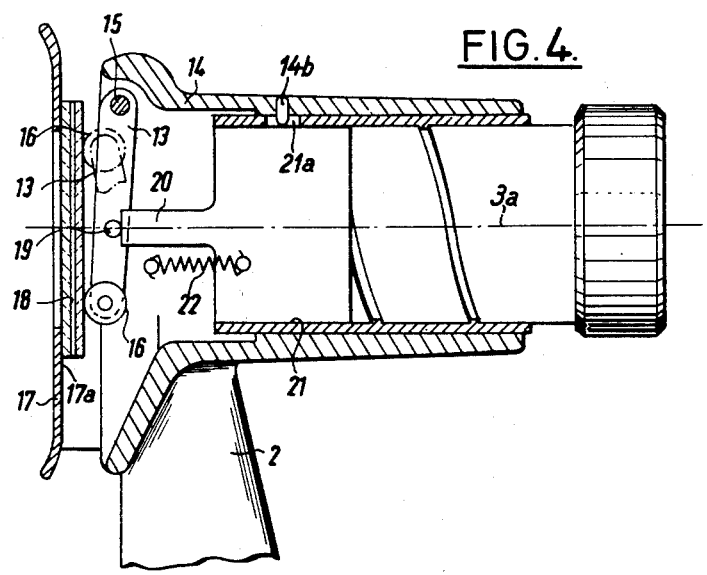
INVENTORS
HANS MULCH
MANFRED RIECKE
By Toulmin & Toulmin
Attorneys Feb. 11, 1964 H. MULCH ETAL 3,120,779
SLIDE PROJECTOR WITH PRECISE FOCUSING
Original Filed Oct. 24, 1958 5 Sheets-Sheet 3

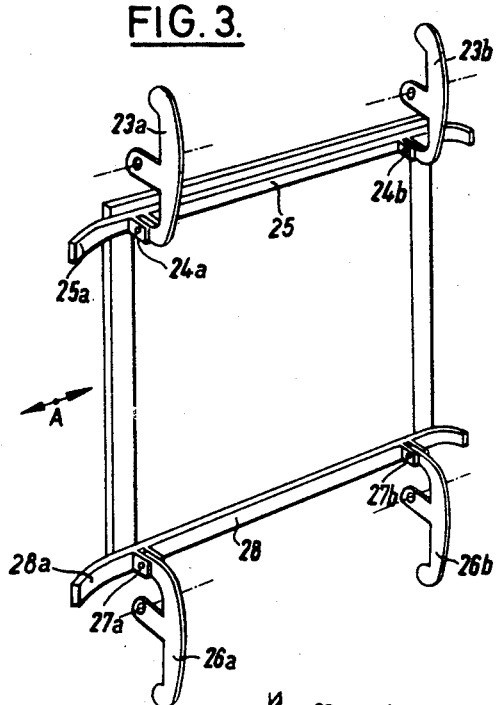
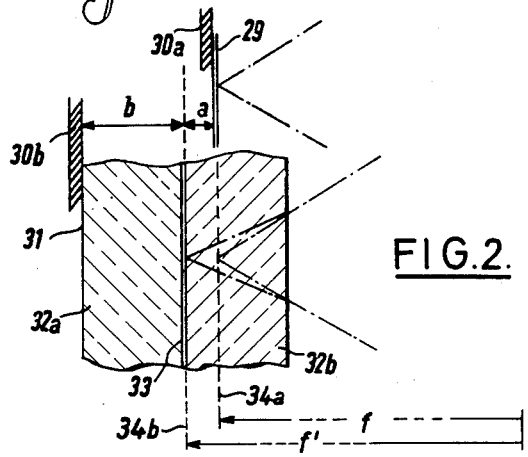

INVENTORS
HANS MULCH
MANFRED RIECKE
By Toulmin & Toulmin
Attorneys

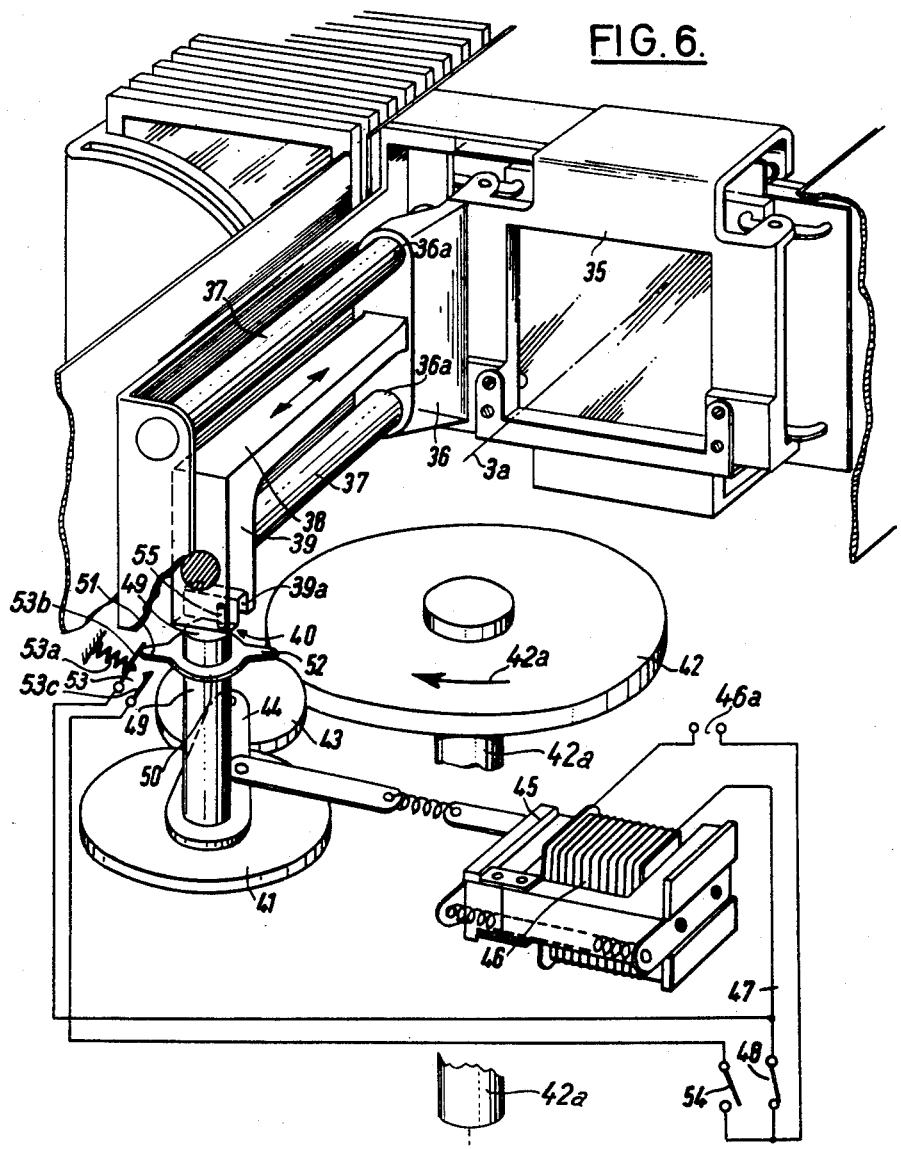

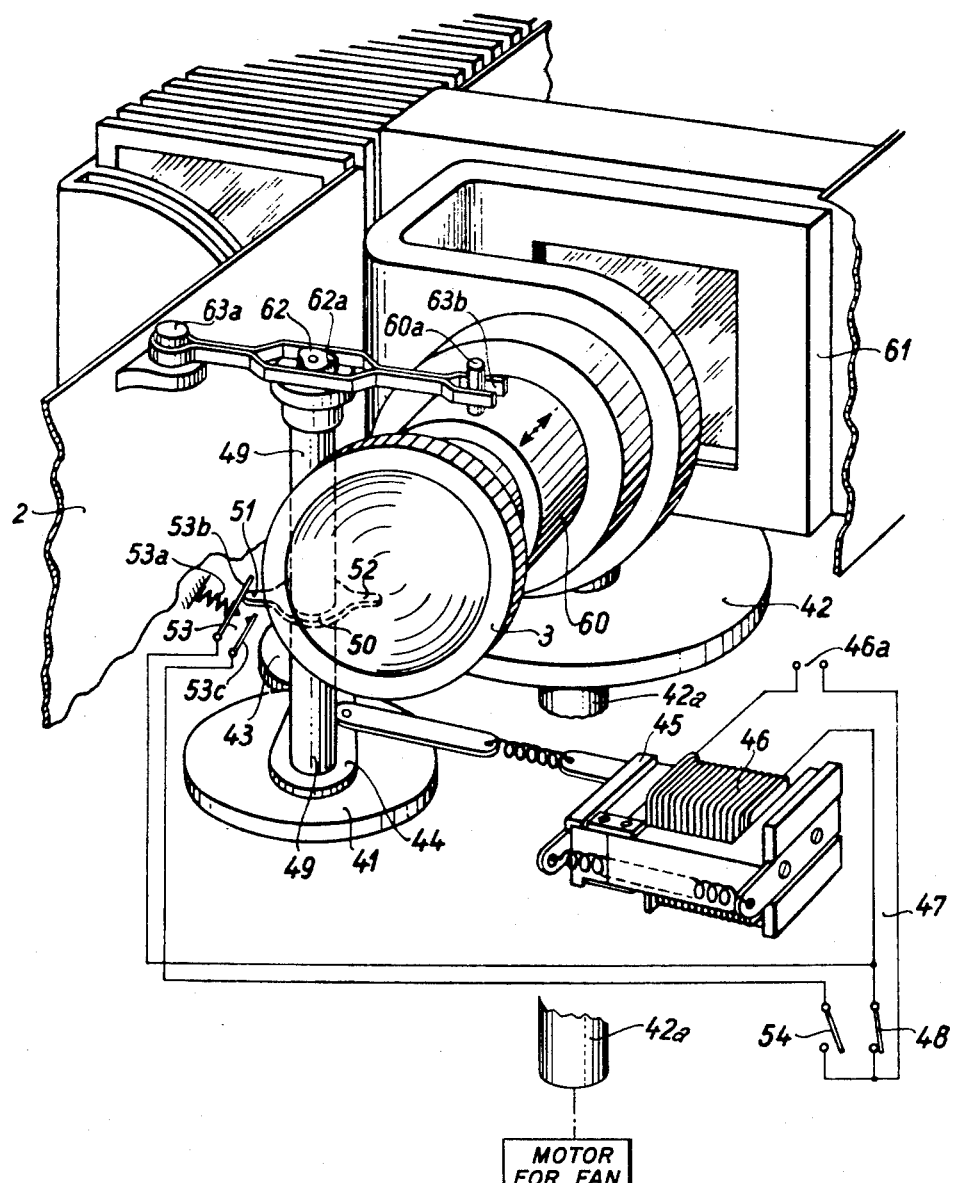

United States Patent Office 3,120,779
Patented Feb. 11, 1964

3,120,779
SLIDE PROJECTOR WITH PRECISE FOCUSING
Hans Mulch, Wetzlar, and Manfred Riecke, Nauborn, near Wetzlar, Germany, assignors to Ernst Leitz G.m.b.H., Wetzlar (Lahn), Germany
Original application Oct. 24, 1958, Ser. No. 769,400, now Patent No. 3,013,469, dated Dec. 19, 1961. Divided and this application Apr. 14, 1961, Ser. No. 103,009
6 Claims. (Cl. 88—24)

The present invention relates to slide projectors.

More particularly, the present invention relates to a slide projector which is self-focusing and which additionally incorporates a fine adjustment mechanism.

There exist a large variety of diapositives, commonly called slides, which are film strips or other transparencies that are either mounted on cardboard frames or are sandwiched between two layers of glass or other transparent material. Since these layers of glass are not of uniform thickness, there arises the necessity of re-focusing the projector whenever a slide the glass layers of which are of different thicknesses than the glass layers of the previous slide, is inserted into the projector. This necessity is due to two factors: (1) a slide is usually received by the projector in such a manner that at least one side of the slide lies upon a certain abutment surface, so that the pictures or transparencies of slides having glass layers of different thicknesses will be located in different picture planes, depending upon the thickness of the layer of glass between the picture proper and the abutment surface, and (2) the presence of glass layers in the light beam causes a shifting of the focal plane of the objective due to the different indices of refraction of glass and air.

There exist self-focusing slide projectors which allow for the first-mentioned of the above factors, such as projectors of the type shown in United States Patent No. 2,298,413, but in such projectors no allowance is made for the second of the above-mentioned factors.

It is therefore an object of the present invention to provide a self-focusing slide projector which overcomes the above disadvantages.

It is another object of the present invention to provide a self-focusing slide projector which is capable of accommodating any one of a number of different types of slides, including slides composed of a transparency sandwiched between two layers of glass, which slides may be of various thicknesses.

The objects of the present invention also include the provision of a self-focusing slide projector in which the index of refraction of the glass of a slide is taken into consideration and is automatically compensated for.

It is yet another object of the present invention to provide a slide projector which incorporates a fine adjustment mechanism.

It is a still further object of the present invention to provide a slide projector which is capable of achieving the above advantages and which is at the same time of simple and rugged construction.

With the above objects in view, the present invention mainly consists in that improvement in a self-focusing slide projector which comprises a support, slide carrier means and objective means arranged on the support, at least one of which two means is movable in the direction of the optical axis of the objective means, and feeler means adapted to engage a slide carried by the slide carrier means and operatively connected to the movable means for moving the same in the above-mentioned direction to adjust the distance between the slide carrier means and the objective means as a function of the thickness of the slide, in particular, a distance which is unequal to but dependent upon the thickness of the slide.

A slide projector according to the present invention may further include a fine adjustment mechanism through the intermediary of which either the slide carrier or the objective means may be moved in the direction of the optical axis of the latter.

Additional objects and advantages of the present invention will become apparent upon further consideration of the specification taken in conjunction with the accompanying drawings in which:

FIG. 1 is a fragmentary sectional view of a slide projector according to the present invention;

FIG. 2 is a schematic representation of the relative positions occupied by the slide carrier while carrying different types of slides;

FIG. 3 is a fragmentary perspective view of a modification of the embodiment shown in FIG. 1;

FIG. 4 is a fragmentary sectional view of another embodiment of a slide projector according to the present invention;

FIG. 6 is a perspective view of a fine adjustment mechanism according to the present invention;

FIG. 8 is a perspective view of a modification of the mechanism shown in FIG. 6.

Figure 5:
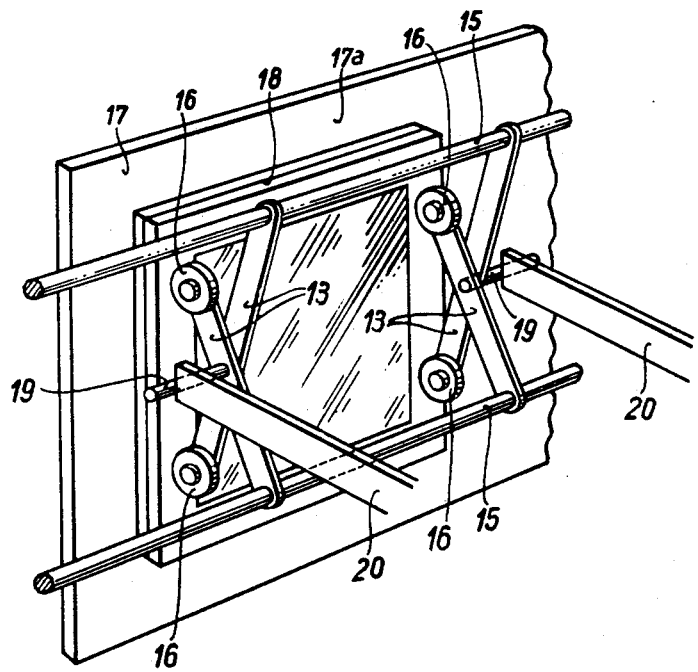
FIG. 5 is a fragmentary perspective view of the embodiment shown in FIG. 4.

Referring now to the drawings, and to FIG. 1 thereof in particular, there is shown a slide projector incorporating a support 2 carrying a tube 1 at one end of which an objective means 3 is mounted, the latter being longitudinally adjustable in the direction of its optical axis 3a. Also mounted on the support 2 is a housing 4, the latter being arranged in front of the condenser lens 5, and a slide carrier 9 is arranged within the housing 4 in alignment with the optical axis 3a of the objective means 3. The slide carrier 9 is formed with a cut-out through which this optical axis 3a passes and the mounting of the slide carrier 9, as is more fully set forth below, is such that the carrier is movable toward and away from the objective means 3 in the direction of the optical axis 3a. That portion of the slide carrier 9 which is next to the cut-out is formed as an abutment surface 8, and this surface lies in a plane which is transverse to the optical axis.

The slide carrier is adapted to receive a slide 10 which may comprise a transparency 10a sandwiched between two layers of glass 10b and 10c, and the arrangement of the parts is such that when this slide is received by the slide carrier 9, one side of the slide lies against the abutment surface 8 so that light emanating from a light source (not shown) will pass through the condenser lens 5, and the cut-out in the slide carrier 9, the slide 10, the tube 1 and the objective means 3.

The slide carrier is formed with two side flanges 11, the under-surfaces of which are engaged by compression springs 12 which abut against inwardly turned flanges 4a of the housing 4.

Cooperating with the slide carrier are suitable feeler means which are adapted to engage the slide 10 and which adjust the distance between slide carrier 9 and the objective means 3 as a function of the thickness of the slide. As will be more fully set forth below, this distance is unequal to but proportional or dependent upon the thickness of the slide. These feeler means comprise four levers 6, two of which are shown in FIG. 1. These levers are so arranged as to engage the slide in the regions of its four corners, and are pivoted about axles 7 and 7a which are mounted in support noses 4b which project inwardly into the housing 4. Each lever has two lever arms 6a and 6b of unequal lengths; the lever arm 6a of shorter length abuts against the free side of the slide 10, i.e., the side of the slide which is opposite to the side which abuts against the surface 8, and the lever arm 6b of greater length abuts against one of the flanges 11 of the slide carrier. With the pivot axis of each lever being spaced, in the direction of the slide carrier, from the line joining the point of contact between the lever arm 6b and the flange 11 and the point of contact between the lever arm 6a and the slide 10, the position of the slide carrier 9 will, upon insertion of a slide 10, automatically assume such a position along the optical axis 3a that the transparency 10a will lie in the focal plane of the objective means 3 and thus occupy the position necessary to ensure proper focussing.

Thanks to the above construction and arrangement not only differences in glass thickness but also the shifting of the focal plane, due to the different indices of refraction of glass and air, are compensated for. This is best illustrated in FIG. 2 which shows the relative positions occupied by the slide carrier while the same carries different types of slides. Thus, 30a shows the position of a slide carrier while the same carries a slide 29 which is simply a transparent sheet. This slide 29 lies in a focal plane 34a that is spaced a focal distance $f$ from the objective (not shown in FIG. 2). 34b shows the position of the slide carrier while the same carries a slide 31 composed of a transparency 33 sandwiched between two layers of glass 32a and 32b. Due to the fact that the layer 32b, being made of glass, has a higher index of refraction than air, the focal plane will be moved away from the objective to the position 34b, and for this reason the transparency 33 of the slide 31 must occupy not the position 34a but the position 34b which is spaced from the objective a distance $f'$, which exceeds the distance $f$ by $a$. Therefore, it would not suffice if the slide carrier were to shift its position by a distance $b$, the latter being equal to one-half the total thickness of the slide which is substantially equal to the thickness of the layer 32a or 32b; instead, the new position 30b of the slide carrier must be spaced $a$ plus $b$ from its previous position 30a, and this is achieved in the embodiment shown in FIG. 1, thanks to the different lengths of the lever arms 6a and 6b. The ratio of the lengths of these arms is selected as a function of the index of refraction of that layer of glass which is on the objective side, i.e., layer 32b. It is this arrangement, also, which allows the slide projector according to the present invention to accommodate relatively very thin slides, in particular, slides wherein the transparency is not sandwiched between glass layers, inasmuch as when the thickness of the slide is small, the actual difference in length of the lever arms 6a and 6b will be substantially negligible, i.e., although the slide carrier will be moved a distance equal to $a$ plus $b$, the same as if there were a glass layer to be compensated for, with thin slides the total of $a$ plus $b$ will be so small as to render negligible the distance $a$; it is only when the slide carrier receives a relatively thick slide, namely, a slide in which the transparency is sandwiched between two layers of glass, that the distance $a$ becomes sufficiently significant to effect the desired correction.

It should also be noted that in the above-described arrangement no special attempt is made to compensate for differences in indices of refraction of different glasses, since it has been found that with the above construction these differences are negligible.

FIG. 3 is a fragmentary perspective view of an embodiment similar to that shown in FIG. 1, except that an elongated guide 25 is connected to those arms of the levers 23a and 23b which engage the slide, and that a second elongated guide 28 is connected to corresponding arms of the levers 26a and 26b. These guides, which are pivotally mounted to the respective levers at 24a, 24b and 27a, 27b, are formed at their ends with curved portions 25a, 28a, so as to facilitate the insertion of a slide in the direction indicated by arrow A.

FIGS. 4 and 5 are sectional and perspective views, respectively, of an embodiment according to the present invention in which the feeler means are connected with the objective means rather than with the slide carrier. Thus, in this embodiment the support 2 carries a tube 14 within which the objective means 21 is mounted for axial sliding movement between limits controlled by a pin 14b which extends into a cut-out 21a of the objective means 21. The feeler means are in the form of four single-armed levers 13 which are mounted at one end for pivotal movement about axles 15 and which carry at their other ends rollers 16 adapted to engage a slide 18 while the latter lies against the abutment surface 17a of the slide carrier 17.

The levers 13 which are on the same side carry a pin 19 against which is pressed an abutment 20 of the objective means 21, suitable spring means 22, one end of which is attached to the tube 14 and the other end of which is attached to the objective means 21, being provided for this purpose.

The position of the pins 19 is so selected that they are nearer to the end carrying the roller 16 than to the end through which the axle 15 passes. In this way, the objective means 21 will be displaced a distance greater than one half the thickness of the slide 18, for the reasons explained above. Similarly, the ratio of the distance between the intermediate point of the levers at which the pin 19 is carried and the end of the levers at which they are pivotally mounted on the axle 15, to the entire length of the levers 13 is selected as a function of the index of refraction of the type of glass customarily used in slides, so that the transparency of the slide 18 will lie in the focal plane of the objective means 21.

FIG. 6 shows a fine adjustment mechanism for making possible the absolutely precise focussing of the slide projector. In the embodiment shown in this figure, the slide carrier together with the feeler means are mounted on a carriage 35 having an extension 36 which is formed with two bores 36a. Two stationary rods 37, which extend in the direction of the optical axis 3a of the objective means (not shown in FIG. 6), pass through the bores 36a, so that the carriage 35 is reciprocable in the direction of the optical axis 3a. The extension 36 has connected to it an L-shaped member having a downwardly extending leg 39 through which the lower one of the rods 37 passes.

The carriage 35 may be moved back and forth in the direction of the optical axis 3a by an eccentric drive means indicated generally at 40. This drive means comprises a receiving element which, in the illustrated embodiment, is constituted by the lowermost portion of the leg 39, and the latter is formed with a groove 39a which extends transversely to the direction in which the carriage 35 is movable.

The drive means also includes a rotatable shaft member 49 which carries an eccentric pin 55, and the latter extends into the groove 39a, so that by rotating the shaft 49 the carriage 35 can be reciprocated in the direction of the optical axis 3a.

The shaft 49 carries at its lower end a friction disk 41 which is adapted to be power-transmittingly connected to a friction drive wheel 42 on a shaft 42a. The latter is driven by the same motor driving the cooling fan of the projector; the fan is not being shown in the drawing, the motor is shown only symbolically inasmuch as they are of conventional construction and do not, by themselves, form any part of the present invention.

Suitable clutch means are provided for power-transmittingly connecting the disk 41 to the wheel 42, and the clutch means comprise an arm 44 which is pivotable about the shaft 49 and carries an intermediate friction disk 43 that is in power-transmitting contact with the disk 41 and, when the arm 44 occupies the position shown in FIG. 6, with the wheel 42. Electro-mechanical means are provided for maintaining the arm 44 in the position shown in FIG. 6, and they include an electromagnet 46 which, when energized, pulls in the armature 45 which is connected to the arm 44. Thus, upon de-energization of the electromagnet 46, the armature 45 will no longer be attracted so that with the wheel 42 normally rotating continuously in the direction 42a, the shaft 49 will cease to rotate.

The energizing circuit 47 of the electromagnet 46 includes a source of electrical energy (not shown) connected at 46a, and a switch 48. The latter is preferably of the push-button type, so that so long as the switch is held in closed position, the carriage will move, whereas upon release of the switch the carriage will come to a halt. In this way, the carriage 35 may be reciprocated to or fro by maintaining the switch 48 closed until the picture is in proper focus.

The energizing circuit further includes an indexing arrangement by means of which the carriage 35 can be automatically moved into an index position, the latter being a null-position which is half-way intermediate the two extreme limits of travel of the carriage 35 under the influence of the above-described fine adjustment mechanism. This indexing arrangement includes an additional switching circuit which is in parallel with the switch 48 and includes two serially connected switches 53 and 54, the latter of which is a push-button type switch similar to switch 48. The switch 53 is normally urged to closed position by a spring 53a and a switch actuator 50 is provided for opening the switch 53 against the action of the spring 53a. This switch actuator 50 is in the form of a cam which is mounted on the shaft 49 for rotation therewith, and has two diametrically opposed noses 51 and 52 each of which is adapted to engage the movable contact arm 53b so as to separate it from the stationary contact arm 53c.

Figure 7:
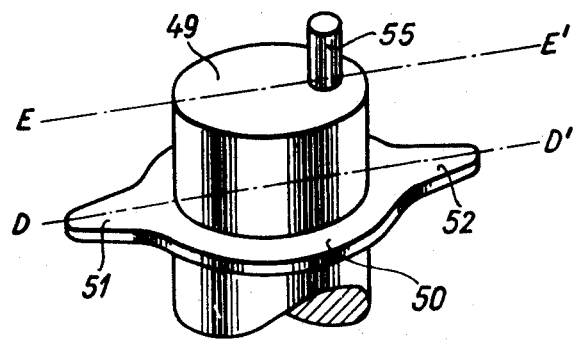
FIG. 7 is a detail of the mechanism shown in FIG. 6.

As is best shown in FIG. 7, the diameter D—D' on which the noses 51 and 52 are arranged is parallel to the diameter E—E' on which the eccentric pin 55 is arranged, these noses and the pin 55 thus being in radial alignment with each other. Consequently, whenever the axis E—E' extends in the same direction as the optical axis 3a—which occurs when the carriage 35 has reached either of its two extreme limits of travel—then both of the noses 51 and 52 will be spaced furthest from the switch 53. However, when the axis E—E' of the pin 55 is at right angles to the direction of the optical axis 3a, i.e., when the axis E—E' is parallel to the transverse groove 39a—which occurs when the carriage 35 occupies a position exactly half-way intermediate its extreme end positions—then either the nose 51 or the nose 52 will engage the movable contact arm 53b and open the switch 53.

Thus, by simply closing the switch 54, the carriage 35 is moved into its index position maintaining the same in closed position until the carriage stops moving. This is so inasmuch as upon closing of the switch 54, the electromagnet 46 will be energized by way of the switch 53, thus bringing about engagement of the clutch 44 and rotation of the shaft 49. This condition is maintained until the carriage 35 has attained its index position at which time opening of the switch 53, in the manner described above, will interrupt the energization of the electromagnet 46 and thus cause cessation of rotation of the shaft 49.

Of course, should the carriage 35 occupy its index position at the instant the switch 54 is closed, this will have no effect on the electromagnet 46 inasmuch as the switch 53 will be held in open position by either the nose 51 or the nose 52.

The above-described construction, particularly that of the switch 53 and its actuator, may be modified to meet different structural conditions. For example, if it is desired to place the switch 53 in a position other than that shown in FIG. 6, then the diameter D—D' may be angularly displaced with respect to the diameter E—E', it being essential only that the orientation of the axis D—D' and the location of the switch 53 be so co-ordinated that the switch 53 is opened whenever the carriage 35 attains its predetermined index position.

The arrangement shown in FIG. 8 differs from that of FIG. 6 in that the carriage 60 which is moved by the fine adjustment mechanism carries the objective means 3 instead of the slide carrier 61. Also, the eccentric pin is replaced by a cam 62 which is carried by the shaft 49 for rotation therewith. This cam cooperates with a lever 63 one end 63a of which is pivotally mounted on the support 2, the other end 63b being bifurcated and engaging a pin 60a carried by the carriage 60. Thus, upon rotation of the shaft 49, which is effected in the same manner as described above in connection with FIG. 6, the cam 62 will cause the carriage 60, and with it the objective 3, to be moved to and fro in the direction of the optical axis.

The arrangement shown in FIG. 8 also incorporates indexing means similar to the ones described above, the orientation of the protuberance 62a of the cam being in radial alignment with the noses 51 and 52 of the cam 50 so that the carriage 60 may be automatically brought to its index position upon closing of the switch 54.

This application is a division of the copending application by the same inventors, filed October 24, 1958, and having the Serial No. 769,400, now Patent No. 3,013,469, issued December 19, 1961.

It will be understood that the present invention is susceptible to modification in order to adapt it to different usages and conditions, and, accordingly, it is desired to comprehend such modifications within this invention as may fall within the scope of the appended claims.

What is claimed is:

1. In a self-focusing slide projector having a support, further having objective means and a slide carrier coaxially disposed and one thereof being mounted on said support, there being means on said support operatively connected to the slide carrier for adjusting the distance between a slide on said slide carrier and said objective means in the direction of the axis of the objective means and at a distance responsive to the thickness of said slide, the improvement comprising: a carriage mounted on said support for movement in the direction of said optical axis, said carriage supporting the other one of said objective means and said slide carrier, a rotatable member having an eccentric pin on one end thereof extending into said groove so that rotation of said rotatable member reciprocates said carriage together with said slide carrier and said slide carrier moving means in said direction to further adjust the distance between said slide carrier and objective means, an electric motor, a clutch member interposed between said motor and said rotatable member, electromagnetic means operatively connected to said clutch member for actuating the same to engage and disengage said motor and said rotatable member, means on said rotatable member for indexing said carriage with respect to said objective means so that a picture of a slide positioned in said slide carrier is located a predetermined distance from said objective means, and a switch in circuit with said electromagnetic means to energize and deenergize the same and actuated by said indexing means to open and closed positions.

2. In a self-focusing slide projector as set forth in claim 1, wherein the projector objective or the slide carrier is mounted on said carriage which is movable in the direction of the optical axis of the objective, a continuously driven shaft, an eccentric drive means operable for moving said carriage in said direction, and said clutch member selectively connecting said eccentric drive means to said driven shaft.

3. In a self-focusing slide projector, the combination of a support member; a carriage member arranged on said support member for movement relative thereto in a predetermined direction; slide carrier means and objective means, said objective means being arranged on one of said members and being so oriented that the optical axis of said objective means extends in said direction, said slide carrier means being arranged on the other of said members in alignment with said optical axis and having an abutment surface which lies in a plane transverse to said optical axis, said slide carrier means being adapted to carry a slide while one side of the latter lies against said abutment surface, one of said means being movable in said direction with respect to the member upon which it is mounted; feeler means adapted to engage the opposite side of a slide carried by said slide carrier means and operatively connected to said one means for moving the same in said direction relative to the member upon which it is mounted to adjust the distance between said slide carrier means and said objective means an amount unequal to but dependent upon the thickness of the slide; and fine adjustment means operatively connected to said carriage member for selectively moving the same together with the means carried thereby in said direction for further adjusting the distance between said slide carrier and said objective means, as required, said fine adjustment means comprising an eccentric drive means for moving said carriage member in said direction, and wherein said eccentric drive means comprises a receiving element which is movable with said carriage member and which is formed with a groove extending transversely to said predetermined direction, and a rotatable member having an eccentric pin which extends into said groove, whereby upon rotation of said rotatable member said carriage member is reciprocated in said predetermined direction.

4. The combination defined in claim 3 wherein the projector incorporates a cooling fan and a motor therefor and wherein said drive means includes clutch means interposed between said rotatable member and said motor for power transmittingly connecting the former to the latter, electromagnetic control means associated with said clutch means for controlling the same, and wherein said carriage is movable in either direction from an index median position in which the picture of a slide carried by said slide carrier is located a predetermined distance from said objective means.

5. The combination defined in claim 3, wherein said projector comprises a motor and clutch means, an electromagnetic means including an electromagnet associated with said clutch means, switching means in circuit with said electromagnet for energizing and de-energizing the same, and switch actuator means driven by said motor and adapted to actuate said switching means whereby said carriage is caused to move to a predetermined index position.

6. The combination defined in claim 3, and further comprising a lever mounted at one end thereof in said projector for pivotable movement relative thereto and connected at the other of its ends to said carriage, rotatable cam means operatively associated with said lever for pivoting the same about said one end thereof, and means for rotating said cam means, whereby said carriage may be moved to and fro in said direction.

References Cited in the file of this patent

UNITED STATES PATENTS

| | | |
|---|---|---|
| 1,620,768 | Joy | Mar. 15, 1927 |
| 2,428,719 | Nemeth | Oct. 7, 1949 |
| 2,503,239 | Antos | Apr. 11, 1950 |
| 2,705,438 | Peto | Apr. 5, 1955 |
| 3,000,258 | Misuraca | Sept. 19, 1961 |